(12) United States Patent
Klara (10) Patent No.: US 9,043,340 B1
(45) Date of Patent: *May 26, 2015

(54) PERSONAL MEDIA DATABASE

(71) Applicant: Google Inc., Mountain View, CA (US)

(72) Inventor: Martin Klara, Oak Park, IL (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,178

(22) Filed: Feb. 10, 2014

Related U.S. Application Data (63) Continuation of application No. 13/277,133, filed on Oct. 19, 2011, now Pat. No. 8,688,712.

(60) Provisional application No. 61/537,004, filed on Sep. 20, 2011.

(51) Int. Cl.
*G06F 17/30* (2006.01)

(52) U.S. Cl.
CPC ................. *G06F 17/30017* (2013.01)

(58) Field of Classification Search
CPC ............................................. G06F 17/30017
USPC ........................................................ 707/748
See application file for complete search history.

(56) References Cited

U.S. PATENT DOCUMENTS

| | | | |
|---|---|---|---|
| 8,224,929 B2 * | 7/2012 | Kissinger et al. ............ 709/219 |
| 2002/0151327 A1 | 10/2002 | Levitt | |
| 2006/0195514 A1 * | 8/2006 | Rogers et al. ................ 709/203 |
| 2007/0156676 A1 * | 7/2007 | Rosenberg ........................ 707/5 |
| 2007/0233701 A1 * | 10/2007 | Sherwood et al. .............. 707/10 |
| 2008/0120339 A1 * | 5/2008 | Guan et al. ................ 707/104.1 |
| 2008/0243733 A1 * | 10/2008 | Black .............................. 706/16 |
| 2008/0319833 A1 | 12/2008 | Svendsen | |
| 2009/0177654 A1 | 7/2009 | Beaupre et al. | |
| 2009/0327222 A1 | 12/2009 | Spitzer-Williams et al. | |
| 2010/0005104 A1 | 1/2010 | DiMaria et al. | |
| 2010/0057778 A1 | 3/2010 | Fein et al. | |
| 2010/0058377 A1 | 3/2010 | Grob et al. | |
| 2010/0287584 A1 | 11/2010 | Starikov et al. | |
| 2011/0191163 A1 | 8/2011 | Allaire et al. | |
| 2012/0030587 A1 | 2/2012 | Ketkar | |
| 2012/0078829 A1 | 3/2012 | Bodor et al. | |
| 2012/0158713 A1 | 6/2012 | Jin et al. | |

* cited by examiner

*Primary Examiner* — Rehana Perveen
*Assistant Examiner* — Tiffany Thuy Bui
(74) *Attorney, Agent, or Firm* — Morris & Kamlay LLP (57) ABSTRACT

A system and computer-implemented method for maintaining a personal media database associated with a user account including media-related information, the method including receiving media-related information regarding a media item from a remote media service, wherein the media-related information comprises rating information regarding the media item, the rating information representing an assessment of the quality of the media item by the user, and the rating information being provided according to a first rating standard, the first rating standard indicating a manner by which media items are rated, converting the rating information according to a second rating standard used at a personal media database, the second rating standard indicating a manner by which media items are rated wherein the second standard is different than the first standard and storing the media-related information including the converted rating information at the personal media database.

20 Claims, 6 Drawing Sheets

PERSONAL MEDIA DATABASE

CROSS-REFERENCE TO RELATED APPLICATIONS

The present application is a continuation of U.S. patent application Ser. No. 13/277,133, entitled "Personal Media Database," filed on Oct. 19, 2011, which claims the benefit of priority under 35 U.S.C. §119 from U.S. Provisional Patent Application No. 61/537,004 entitled "Personal Media. Database," filed on Sep. 20, 2011, the disclosures of which are hereby incorporated by reference in their entirety for all purposes.

BACKGROUND

The subject disclosure generally relates to a media database, and, in particular, to a personal media database.

Users may typically consume media content available at various media services and may rate or review the media content after the consumption. The ratings and reviews are useful to the user when the user wishes to make decisions regarding other media items and may further be helpful to the media service when recommending media to the user.

However, typically, each media service is independent from other media services and the consumption information, ratings and reviews of the user for media items consumed at each service is maintained in association with the specific media service. When users decide to unsubscribe from a service or the media service is shut down for various reasons, the consumption information, reviews and ratings maintained at the service are lost for all media consumed with respect to the specific media service.

Thus, a personal media database storing all media-related information regarding a user's media consumption may be desirable.

SUMMARY

The disclosed subject matter relates to a computer-implemented method for maintaining a personal media database associated with a user account including media-related information, the method comprising receiving, at one or more computing devices, media-related information regarding a media item from a remote media service, wherein the media-related information comprises rating information regarding the media item, the rating information representing an assessment of the quality of the media item by the user, and the rating information being provided according to a first rating standard, the first rating standard indicating a manner by which media items are rated. The method further comprising converting, using the one or more computing devices, the rating information according to a second rating standard used at a personal media database, the second rating standard indicating a manner by which media items are rated wherein the second standard is different than the first standard, wherein the personal media database is communicatively coupled to the one or more computing devices and storing the media-related information including the converted rating information at the personal media database.

The disclosed subject matter also relates to a system for maintaining a personal media database including media-related information, the system comprising one or more processors and a machine-readable medium comprising instructions stored therein, which when executed by the processors, cause the processors to perform operations comprising receiving media-related information regarding a media item from a remote media service, the media-related information including rating, information regarding the media item, the rating information being provided according a first rating standard, the first rating standard comprising, a manner for representing an assessment of media items. The operations further comprising convening, the rating information according to a second rating standard used at a personal media database, the second rating standard comprising a manner for representing an assessment of media items, wherein the for representing an assessment of media items provided by the second rating standard is different than the for representing an assessment of media items provided by the first standard, wherein the personal media database includes rating information for a plurality of media items, wherein the rating information for the plurality of media items is provided according to the second standard.

The disclosed subject matter also relates to a machine-readable medium comprising instructions stored therein, which when executed by a machine, cause the machine to perform operations comprising receiving media-related information regarding a plurality of media items from a remote media service, wherein the media-related information comprises rating, information regarding one or more of the plurality of media items provided according a first rating standard. The operations further comprising convening the rating information, such that the rating information regarding the one or more of the plurality of media items is formatted according to a second standard used at a personal media database, wherein the second standard is different than the first standard and storing the media-related information including the converted rating information at the personal media database.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed, description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As used herein, "media-related information" corresponds to all information related to consumption of media items including consumption history, rating and reviews corresponding to various types of media including but not limited to movies, TV programming, music, books and periodicals. In one example, the media-related information includes media rating information. "Rating information" is given its plain and ordinary meaning including but not limited to information (e.g., value, score, or other indication) representing an assessment or evaluation of a media item, by the user. The evaluation may include an assessment of the quality of the media item, and may represent the user's opinion regarding the media item as to the quality, likeability and other characteristics of the media item.

The disclosed, subject matter provides for a personal media database for storing media-related information relating to media content consumed by a user, including media consumed at online media services as well as media consumed offline. The media-related information includes rating information provided by the user in response to consuming the media. The rating information provides an indication of the user's assessment of a media item. The personal media database provides a central repository for the user's media-related information where the user has consumed media through various channels, e.g., one or more online media service sites or offline, such that the user may access media-related information regarding the media items he/she consumed in one central database. Typically, each of the one or more media service websites (e.g., AMAZON, NETFLIX) may allow the user to provide a rating of media items purchased or consumed, and provides a rating standard for rating the media item. The personal media database collects the media-related information including the rating information from these remote media services and maintains the rating information according to a uniform rating standard such that all media items are rated according to a single standard, regardless of the type of media (e.g., video, audio, text) and the source of the media-related information (e.g., media consumed at an online media service or offline). In one example, the media related database stores media items associated with the user, and stores media-related information for each of the media items. The media-related information (e.g., the standardized rating information) may be used to provide the user with cross-media recommendations. Furthermore, the present system provides for sharing the media-related information with one or more contacts at one or more remote social networking sites. The system may further provide for receiving media-related information and recommendations from the one or more contacts of the user at the remote social networking sites, and providing the user with recommendations further based upon the contact media-related information and recommendations.

Figure 1:
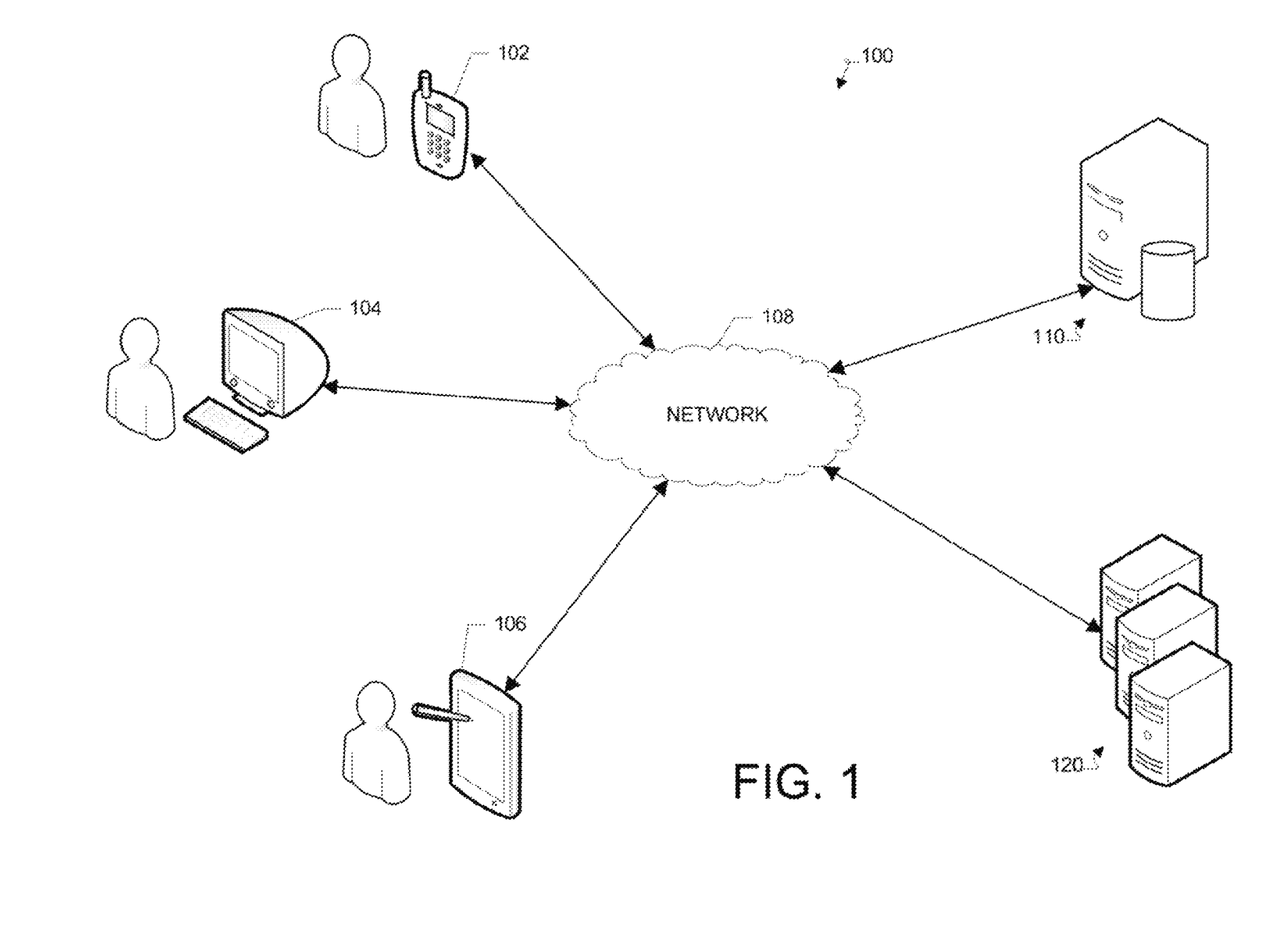
FIG. 1 illustrates an example client-server network environment, which provides for generating and maintaining a personal media database for users of the system.

FIG. 1 illustrates an example client-server network environment, which provides for generating and maintaining a personal media database for users of the system. A network environment 100 includes a number of electronic devices 102, 104 and 106 communicably connected to a server 110 and remote servers 120 by a network 108. Server 110 includes a processing device 112 and a data store 114. Processing device 112 executes computer instructions stored in data store 114, for example, to assist in maintaining a personal media database for the users interacting with electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for group conversation within a social network. In the example of FIG. 1, electronic device 102 is depicted as a smartphone, electronic device 104 is depicted as a desktop computer, and electronic device 106 is depicted as a PDA.

According to some aspects, remote servers 120 can be any system or device having a processor, a memory and communications capability for hosting various media service sites and/or remote social networking sites. In one embodiment, one or more remote servers 120 hosting a remote social networking site may maintain social graphs of users and their contacts. The remote social networking sites hosted on the one or more remote servers 120 may enable users to create a profile and associate themselves with other users at a remote social networking site. The remote servers 120 may further facilitate the generation and maintenance of a social graph including the user created associations. The social graphs may include, for example, a list of all users of the remote social networking site and their associations with other users of a remote social networking site.

Additionally, one or more remote servers 120 may host various media services. The media services hosted on the one or more of the remote servers 120 may provide services such as online media streaming, media distribution, internet media database and other media related services and may include media distribution or electronic commerce sites offering on-demand or retail media including movies. TV programming, music, books, periodicals and other similar forms of media (e.g., AMAZON, NETFLIX).

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. Communications between the client devices 102, 104 and 106, server 110 and/or one or more remote servers 120 may be facilitated through the HTTP communication protocol. Other communication protocols may also be facilitated including for example, XMPP communication, for some or all communications between the client devices 102, 104 and 106, server 110 and one or more remote servers 120.

Users may interact with the system hosted by server 110, and/or one or more social networking sites or media services hosted by remote servers 120, through one or more client applications at the electronic devices 102, 104 and 106. Alternatively, the user may interact with the system, the one or more media services and/or remote social networking sites through web based browser applications at the electronic devices 102, 104 and 106. Communication between electronic devices 102, 104 and 106 and the system, media services and/or one or more remote social networking sites, may be facilitated, through a network (e.g., network 108).

Users may interact with the system hosted at the server 110, to manage their media consumption history and media-related information within at personal media database. Users operating electronic devices 102, 104 and 106 can manage their media-related information, share their media-related information with contacts and receive media recommendations from the service (e.g., through server 1101.

Users of the system may access the system and create a user profile. Users may further provide information regarding one or more remote media services where the user has an existing profile or user account. The system may then establish a communication with the one or more remote media services to import the media-related information corresponding to the user maintained at the remote media services (e.g., at a server 120 hosting the remote media services). The communication may be facilitated through various communication protocols including for example HTTP and may be facilitated through API calls.

Upon detecting, a user request to interact, with the system at a client device (e.g., electronic devices 102, 104 and 106), the client device may initiate a communication with the system and send a data set including login information of the user. The data set can be transmitted from the user's client device (e.g., electronic devices 102, 104 and 106) and received at server 110 hosting the system, for user authentication. Once the user is authenticated and access is granted to the user, the system may retrieve and send a data set to the user's client device, for displaying a graphical user interface at the client device operated by the user (e.g., electronic devices 102, 104 and 106).

The system may further send a query to the user's client device (e.g., displayed within the graphical user interface displayed at the client device) for information regarding the one or more media services. Upon receiving a response from the user's client device (e.g., in response to a selection by the user operating the device), the system may initiate establishing communication with the one or more media services (e.g., through network 108 and remote servers 120). Where a remote media service requires user authentication for allowing access to the system, the system may cause the client device to reroute the user to a website associated with the media service. The user's client device may then directly communicate with the remote media service to log into the service, for example by sending a data set including the login information. The media service may authenticate the user using the received data set and may provide the user's client device with a token (e.g., a temporary token). The system hosted at server 110 may then retrieve the token from the user's client device, and may establish communication with one or more servers 120 hosting the remote social networking site using the token. Alternatively, the authentication process may be performed seamlessly, without redirecting the user the media service. Similar steps may be performed for each of the one or more social networking sites associated with the user operating the client device.

Upon being granted access to each of the one or more media services (e.g., through one or more remote servers 120), the system may then import the media-related information stored at the remote media service. A remote media service (e.g., hosted by one or more remote servers 120) may maintain media-related information including media consumption information, ratings and review according to a first rating standard. The media-related information as each media service may be unique, especially with regard to the rating and review system used at each media service for the media-related information associated with the user maintained by the media service. For example, the rating, standard at the remote media services may be a star system with various numbers of stars, may be a numeric or alphabet rating standard (e.g., a 1-5 or grading system), or may be a thumbs up, thumbs down rating standard. Other various rating standards may also be used by one or more of the media services. Furthermore, the media-related information at the media service may include textual reviews and/or comments.

The media-related information corresponding to user 130 may be stored at a storage at the one or more remote servers 120 or may be stored remotely and the one or more remote servers 120 may access the remote storage and retrieve such information. The one or more remote servers 120 hosting the remote media service may provide the system (e.g., through server 110) with data sets including the media-related information corresponding to the user. The media-related information provided to the system may depend upon security settings and preferences at the system and/or the remote media service.

The server 110, upon receiving the media-related information from one or more media services, may analyze the received media-related information to determine the rating standard of the media-related information or may query the media service for the media-related information rating standard used at the media service. The system may then convert at least a portion of the received media-related information according to a second rating standard used for media-related information maintained by the personal media database. For example, the system may have a uniform rating standard for storing rating information included within the media-related information. All media-related information maintained at the system may be formatted according to a uniform rating standard. In one aspect, the system may maintain a conversion table for converting the media-related information received from the media service to the uniform rating standard adopted by the system. While the personal media database is described herein as adopting a single uniform standard, the system may alternatively have two or more rating standards, and may convert the portion of the media-related information (e.g., the rating information) according to one of the two or more rating standards.

Furthermore, the user interacting with a client device may enter additional media-related information. For example, a graphical user interface may be presented to the user and the user may enter media-related information regarding various media the user consumed (e.g., online or offline). The graphical user interface, may further query the user for reviews and comments regarding the media according to the uniform rating standard. The inputted data is received (e.g., at server 110) and stored within the personal media database for the user. For example, the personal media database may store each media item as an entry within a database structure, wherein the entry includes a user ID identifying the user, an entity ID identifying the media item and a data set representing the media information associated with the media item. In another example, the media items may be stored for a user, within a table including the entity ID and media information associated with the entity ID wherein the table is associated with the user (e.g., User ID).

Thus, the system creates a personal media database for the user unifying media-related information related to media content consumed by the user at one or more media services or other sources (online or offline) and across various media types (e.g., movies, TV shows, music, audio programming, books). The media-related information is stored within the personal media database according to a uniform rating standard, such that the media-related information may be used to provide the user with cross-media recommendations based on all media content consumed by the user regardless of the source of the media content or the type of media content.

Furthermore, the personal media database provides a means for preserving, media-related information and transferring the media-related information into various media services and sharing the media-related information with contacts of the user (e.g., other users associated with the user at one or more social networking sites).

Figure 2:
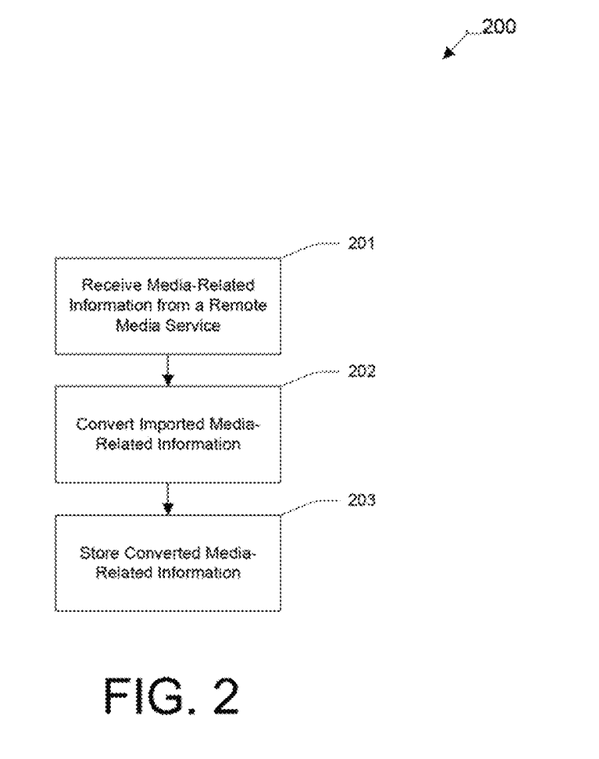
FIG. 2 illustrates a flow diagram of an example process for importing media-related information from a remote media service.

FIG. 2 illustrates a flow chart of a process 200 for importing media-related information from a remote media service. In step 201, the system receives media-related information from a remote media service. For example, the system may receive a request from a user to import media-related information from a remote media service. For example, when a user first registers with the system and creates a personal media database, the user may identify one or more media services that the user has used in the past for purchasing or consuming media content. The user may request that the system retrieve media-related information associated with the user from the media services into the personal media database.

In response to receiving the request, in step 201, the system may establish a communication with the remote media service. For example, the system may establish, a communication by prompting the user to log into the remote service provider and once the user is authenticated at the remote media service, the system may then establish a communication with the remote media service. In response to the user request, the system may request the media-related information from the remote media service. Once the system is in communication with the media service (e.g., through network 108), the system may request media-related information associated with the user from the media service. The remote media service may then transmit the media-related information to the system (e.g., through network 108). Alternatively, a user may request a remote media service to transmit media-related information to the personal media database maintained by the system and the remote media service transmits the media information to the system (e.g., through network 108).

Next, in step 202, the system converts the received media-related information according to a uniform rating standard. The process of converting media-related information is described in more detail below with respect to FIG. 3. In step 203, the converted media-related information is stored (e.g., at storage 114) for later retrieval. The stored media-related information may further be displayed to the user, or may be used by the system to provider the user with media recommendations.

Figure 3:
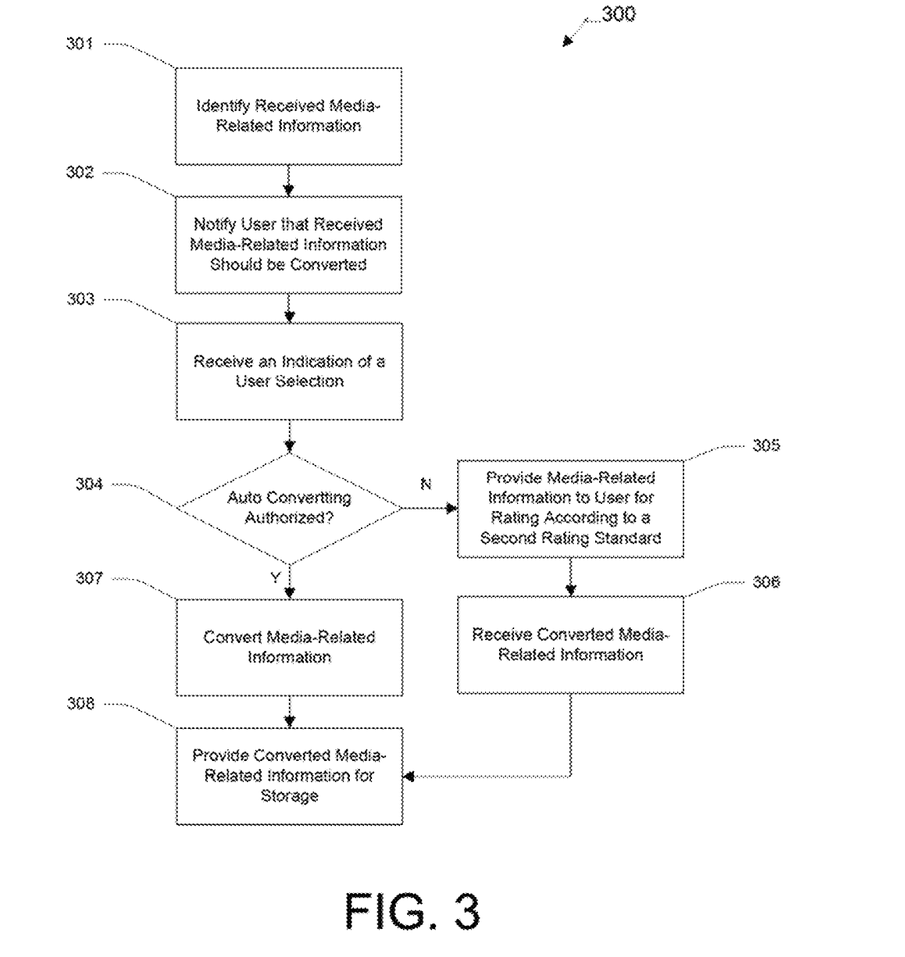
FIG. 3 illustrates a flow diagram of a process for converting media content from a first rating standard to a uniform rating standard of the personal media database.

FIG. 3 illustrates a flow chart of a process 300 for converting media related information from a first rating standard (e.g., rating standard used by a remote media service) to a uniform rating standard of the personal media database. The process begins in step 301, when the system identifies media-related information received from a remote media service (e.g., over network 108). Once the media-related information is received, the system may determine the current rating standard of the media-related information, e.g., the rating standard in which the comments, reviews and other rating information relating, to media content is stored. For example, the remote media service may store the media-related information according to a specific rating standard (e.g., numerical rating, thumbs up, thumbs down, star system, textual reviews and comments). The system identifies the specific rating standard the media-related information is maintained at the remote media service.

In step 302, the system provides the user with a notification that the media-related information should be converted before being stored at the personal media database. The notification may include a description of the rating standard used at the remote media service and a may further include a description of how the converting will be carried out (e.g., how various ratings according to the current rating standard will be converted to ratings according to the uniform rating standard). The notification may further prompt the user to select whether the user would like to manually rate the media-related information according to the uniform rating standard or whether the user would like the system to automatically convert the media-related information according to the uniform rating standard.

In step 303, the system receives an indication of a user selection, and the process continues to step 304. In step 304, the system determines whether the user selection has authorized the system to automatically convert the media-related information. If in step 304, it is determined that the user would like to manually reenter rating and other information regarding the media-related information, in step 305, provides the media-related information for display to the user such that the user can rate the media items corresponding to the media-related information according to a second rating system (e.g., the uniform rating system). For example, the system may generate a listing of all media items included within the media-related information and provide the listing for display to the user (e.g., at a graphical user interface displayed at the client, device of the user). The listing may include information associated with each of the media items which was received from the remote media service, such that the user is given a point of reference for rating the content according to the uniform rating standard. The user may then enter rating, information for the media items according to the uniform rating standard adopted by the system. In step 306, the converted media-related information is received from the user and provided for storage in step 308. The convened media-related information may be stored to the personal media database of the user (e.g., at storage 114 or one or more remote databases accessible by the system).

Alternatively, if in step 304, it is determined that the user has authorized the system to automatically convert the media-related information, the process continues to step 307. In step 307, the system converts the media-related information according to the uniform rating standard. The system may request that the user provide a conversion of the rating entered at the media service, to the rating standard of the uniform rating standard (e.g., where it is the first time media-related information from a remote service provider having a rating standard is being converted for the user). For example, the user may be asked to enter what a 1, 2 and 3 star rating of a media item translates to for the rating standard of the uniform rating standard used at the system. The system may maintain a conversion table for converting media-related information including ratings and comments entered at a media service into media-related information (e.g., ratings and comments) according to the uniform rating standard. The system may convert the media-related information from the remote media service and continues to step 308, where the converted media-related information is provided for storage at the personal media database.

In addition to the media-related information including ratings, reviews and consumption information into the personal media database from one or more remote media services, the user may further input media-related information for additional media items which the user may have experienced offline or through other sources (e.g., sources that do not provide support for importing media-related information to the personal media database). The entertainment database thus provides a single database for maintaining media-related information regarding all media items purchased and/or consumed by a user, regardless of the source or mechanism used for purchasing or consuming the media items and thither independent of the specific type of the media items.

The media-related information maintained at the personal media database may include any type of media, including video content such as movies and TV shows, audio content including music, and textual content such as books and periodicals. In addition, by enabling the user to manually input consumption and rating information regarding various types of media, the media-related information may include both media consumed online and well as media consumed offline. Thus, the personal media database provides the user with a single database for storing media-related information regarding media content experienced by a user.

The media-related information maintained at the personal media database may be used to provide recommendations to the user regarding, other media items that the user may be interested in. As all types of media are maintained at the personal media database using a single rating standard, the system is capable of providing cross media recommendations based upon the rating and consumption information maintained at the personal media database. The rating standard of the personal media database may enable the user to provide feedback (e.g., ratings and reviews for media content on an item specific level, as well as on a categorical level such as genre, collection (e.g., book collection, music album) and artist, actor, director, author, and other collective rating categories. Thus, the recommendations may be provided in view of category rating in combination with item specific ratings. The system is further capable of deducing preferences based on different ratings associated with a single media item (e.g., a movie rated individually, a genre of the movie rated, the actors within the movie rated).

The ratings associated with media items may be analyzed to determine patterns of media item preference. These patterns may be determined based on consistencies and inconsistencies in media item and category based ratings. For example, where a user has rated a media item positively but has rated categories associated with the media item negatively, the system may analyze the media item characteristics and determine preferences in media even where such preferences have not explicitly been expressed by the user. The system may provide recommendations of all types of media based on media-related information stored within the personal media database across all media types, such that ratings of movies and TV shows may result in recommendations for music and books. Since the personal media database has media-related information stored in a single standard for all media types, and includes categorical ratings in addition to item specific ratings, a user may be presented with item recommendations based on all of their media consumption.

In addition, the system allows the user to share the media-related information of the user with his/her contacts (e.g., contacts at one or more social networking sites), and further receiving media-related information and recommendations from his/her contacts. The user may select specific media-related information for sharing with his/her contacts (e.g., at one or more social networking sites). Further, the user may view media-related information shared by contacts. The system may further provide recommendations to the user based on the media-related information of his/her contacts. The media-related information received from contacts is stored using the uniform rating standard, so that recommendations may easily be generated and provided to the user based on the media-related information of the contacts.

In addition, the personal media database allows the user to transfer media-related information to other remote media services (e.g., when the user chooses to terminate their personal media database account or where the user wishes to use the media-related information for other purposes at other media services). This allows the user to preserve all of the media-related information at a single repository and to transfer media-related information into various media services (and other various services) as needed.

Figure 4:
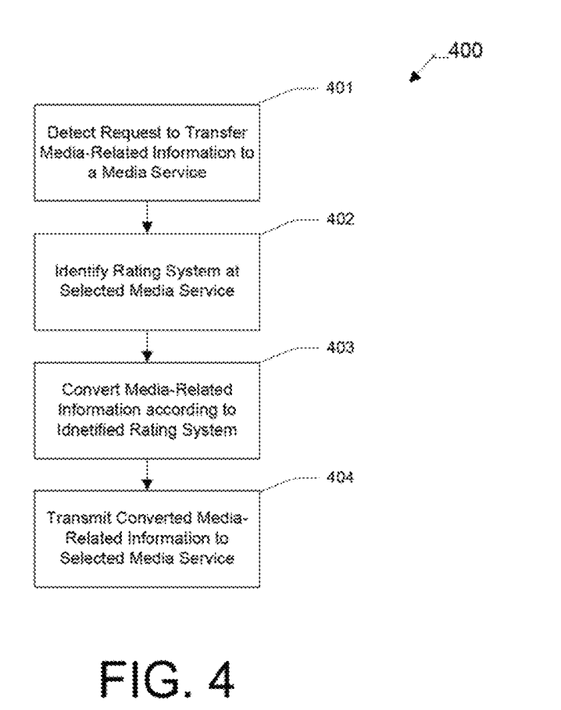
FIG. 4 illustrates a flow diagram of a process for transferring media-related information to a remote media service.

FIG. 4 illustrates a flow chart of a process 400 for transferring media-related information to a remote media service. In step 401, the system receives a request to export or transfer media-related information from the personal media database to a remote media service. For example, the user may select specific media-related, information (e.g., media-related information regarding, a particular set of media items) and may request that the system transmit the media-related information to a selected media service.

In response to receiving, the request, the system may establish a communication with the remote media service. For example, the system may establish a communication by prompting the user to log into the remote service provider and once the user is authenticated at the remote media service, the system may then establish a communication with the remote media service.

In step 402, the system detects that rating standard at the selected remote media service. Once the system is in communication with the media service (e.g., through network 108), the system may query the selected media service for the media-related information rating standard used at the remote media service (e.g., through network 108). Alternatively, the system may maintain a listing of the media-related information rating standard used at one or more media services and may search the listing for the selected remote media service.

Next, in step 403, the system converts the selected media-related information according to the media-related information rating standard detected in step 402. The process of converting media-related information for transferring to a remote media service is described in more detail below with respect to FIG. 5. In step 404, the converted media-related information is transmitted to the selected remote media service (e.g., through network 108).

Figure 5:
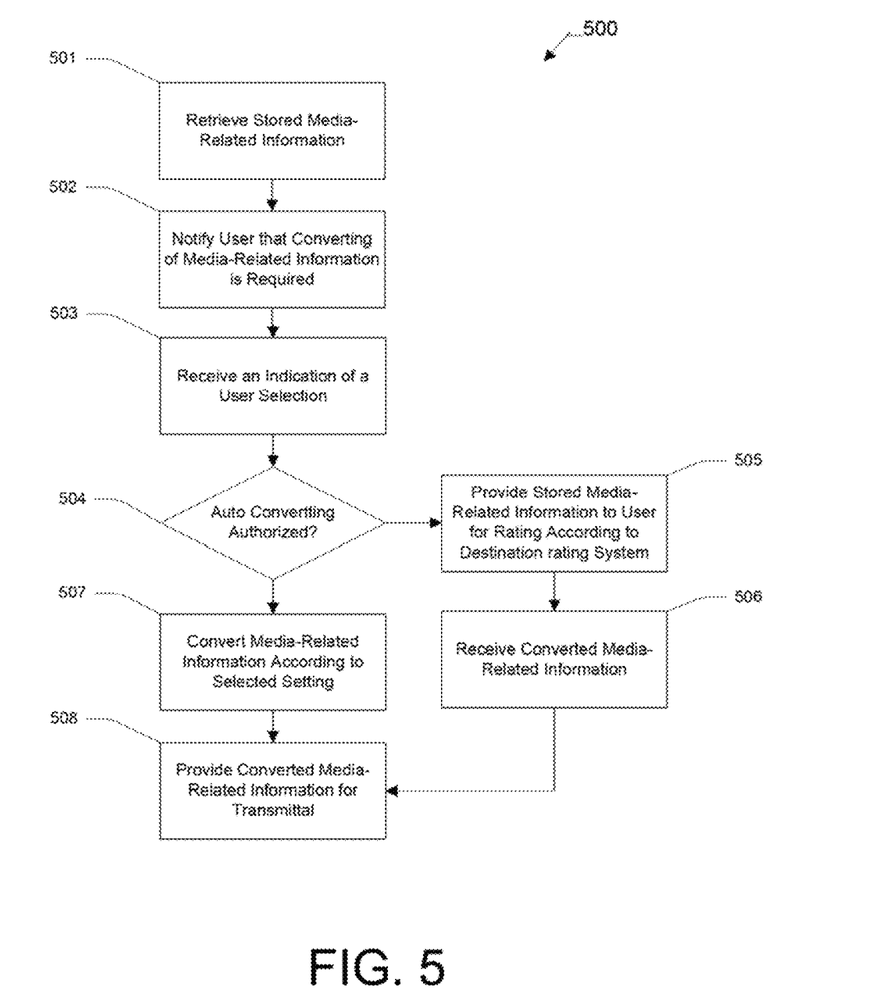
FIG. 5 illustrates a flow diagram of a process for converting media-related information from the uniform rating standard used at the personal media database to a second rating standard used at a remote media service.

FIG. 5 illustrates a flow chart of a process 500 for converting media-related information from the uniform rating standard used at the personal media database to a second rating standard used at a remote media service. The process begins in step 501. When the system retrieves media-related information selected by a user for transferring to a remote media service and an indication of the rating standard used at the selected remote media service.

In step 502, the system provides the user with a notification that the selected media-related information should be convened before being transferred to the remote media service. The notification may include a description of the rating standard used at the remote media service and a description of how the convening will be carried out. The notification may further prompt the user to select whether the user would like to manually convert the media-related information according to the rating standard used at the remote media service (e.g., rate the media items according to the rating standard of the remote media service) or whether the user would like the system to automatically convert the media-related information.

In step 503, the system receives an indication of a selection from a user, and the process continues to step 504. In step 504, the system determines whether the user selection has authorized the system to automatically convert the selected media-related information. If in step 504, it is determined that the user would like to manually convert the media-related information, in step 505, the system generates a listing of all media items corresponding, to the selected media-related information and provides the listing to the user (e.g., at a graphical user interface displayed at the client device of the user). The listing may further include information associated with each of the media items, such that the user is given a point of reference for converting media-related information (e.g., ratings and reviews) according to the rating standard of the remote media service. The user may then enter media-related information (e.g., ratings and reviews) for the media items according to the rating standard adopted by the remote media service. In step 506, the converted media-related information is received from the user and provided for transmittal to the remote media service in step 508.

Alternatively, if in step 504, it is determined that the user has authorized the system to automatically convert the media-related information, the process continues to step 507. In step 507, the system converts the selected media-related information according to the rating standard at the remote service provider. The system may request that the user provide a conversion of the media-related information (e.g., ranting and reviews), to the rating standard of the remote service provider (e.g., when it is the first time media-related information is being transferred to a remote service provider having a rating standard). The system may maintain a conversion table for convening media-related information (e.g., rating and reviews) stored at the personal media database (e.g., ratings and comments) to the rating standard at a media service. The system may convert the media-related information and continues to step 508 where the converted media-related information is provided for transmittal to the remote media service.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
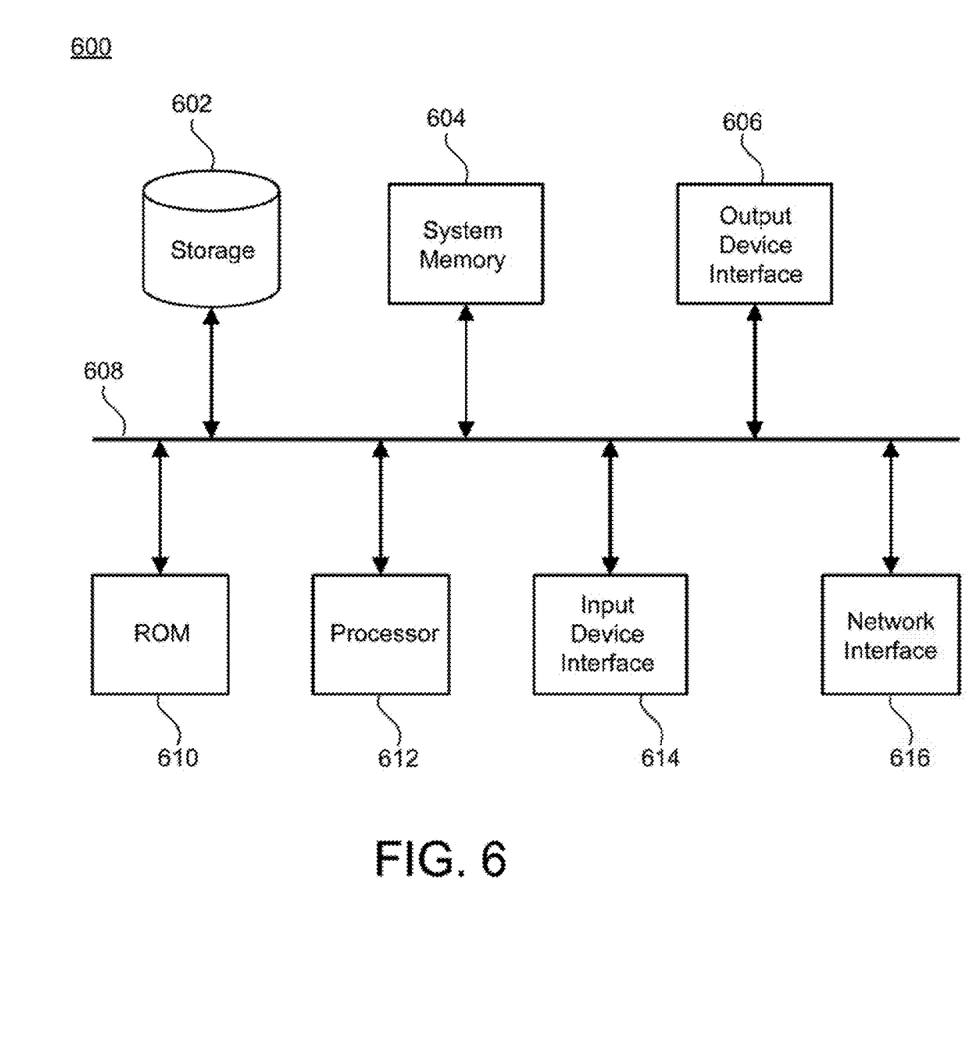
FIG. 6 conceptually illustrates an electronic system with which some implementations of the subject technology are implemented.

FIG. 6 conceptually illustrates an electronic system with which some implementations of the subject technology are implemented. Electronic system 600 can be a server, computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drivel as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for maintaining a personal media database in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input, in addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having, a graphical user interface or a. Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the frill scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the an are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for implementing a personal media database, the method comprising:
    receiving, from a first remote media service, first rating information for a user and representative of one or more user quality assessments of one or more first media items, the first rating information being provided according to a first rating standard by which media items are rated at the first remote media service;
    receiving, from a second remote media service, second rating information for the user and representative of one or more user quality assessments of one or more second media items, the second rating information being provided according to a second rating standard by which media items are rated at the second remote media service, the second rating standing being different than the first rating standard;
    converting, at one or more computing devices, the first rating information and the second rating information to a third rating standard, the third rating standard being different than the first and second rating standards;
    storing the converted first rating information and the converted second rating information as user rating information at the one or more computing devices and in connection with a user account of the user;
    receiving, at the one or more computing devices, an updated assessment for a media item associated with the user rating information stored at the one or more computing devices, the updated assessment being provided in the third rating standard; and
    updating the stored rating information for the media item.

2. The method of claim 1, further comprising:
    receiving one or more user media-related information selections for sharing with one or more users who are in a social graph with the user; and
    providing the one or more user media-related information selections with respective user accounts for the one or more users.

3. The method of claim 1, further comprising:
    providing a media recommendation for the user based at least in part on the user rating information stored at the one or more computing devices.

4. The method of claim 3, further comprising:
    receiving contact media-related information associated with one or more contacts who are in a social graph with the user; and
    storing the contact media-related information at the one or more computing devices in the third rating standard; and
    providing the media recommendation based at least in part on the stored contact media-related information.

5. The method of claim 3, further comprising:
    providing a set of media preferences for the user;
    determining that the user provided an assessment of a respective media item that is inconsistent with an assessment provided by the user of a category for the media item;
    updating the set of media preferences based on the determining; and
    providing the media recommendation based at least in part on the updated set of media preferences.

6. The method of claim 5, further comprising:
    determining that the user rated the respective media item positively and rated the category negatively;
    wherein the set of media preferences is updated based on one or more characteristics of the respective media item.

7. The method of claim 1, further comprising:
    converting the updated rating information to the first rating standard at the one or more computing devices; and
    transferring the converted updated rating information to the first remote media service.

8. The method of claim 1, wherein the first rating information and the second rating information are automatically converted to the third rating standard when they are received.

9. The method of claim 1, wherein the first rating information and the second rating information is for a plurality of media items, the plurality of media items including video, audio or textual media items.

10. The method of claim 1, wherein converting the first rating information and the second rating information includes obtaining, from the user, translations of the first rating standard and second rating standard to the third rating standard.

11. The method of claim 1, wherein converting the first rating information and the second rating information includes obtaining, from the user, third rating information and fourth rating information corresponding to the first and second rating information, respectively, the third and fourth rating information being according to the third rating standard.

12. A machine-readable non-transitory storage medium comprising instructions stored therein, which when executed by a machine or computer, cause the machine or computer to perform operations comprising:

receiving, from a first remote media service, first rating information for a user and representative of one or more user quality assessments of one or more first media items, the first rating information being provided according to a first rating standard by which media items are rated at the first remote media service;

receiving, from a second remote media service, second rating information for the user and representative of one or more user quality assessments of one or more second media items, the second rating information being provided according to a second rating standard by which media items are rated at the second remote media service, the second rating standing being different than the first rating standard;

converting the first rating information and the second rating information to a third rating standard, the third rating standard being different than the first and second rating standards;

storing the converted first rating information and the converted second rating information as user rating information in connection with a user account of the user;

receiving an updated assessment for a media item associated with the stored user rating information, the updated assessment being provided in the third rating standard; and updating the stored rating information for the media item.

13. The machine-readable storage medium of claim 12, further comprising:

converting the updated rating information to the first rating standard; and transferring the converted updated rating information to the first remote media service.

14. The machine-readable storage medium of claim 12, further comprising:

providing a media recommendation for the user based at least in part on the stored user rating information.

15. The machine-readable storage medium of claim 14, further comprising:

providing a set of media preferences for the user;

determining that the user provided an assessment of a respective media item that is inconsistent with an assessment provided by the user of a category for the media item;

updating the set of media preferences based on the determining; and providing the media recommendation based at least in part on the updated set of media preferences.

16. The machine-readable storage medium of claim 15, further comprising:

determining that the user rated the respective media item positively and rated the category negatively;

wherein the set of media preferences is updated based on one or more characteristics of the respective media item.

17. The machine-readable storage medium of claim 14, further comprising:

receiving contact media-related information associated with one or more contacts who are in a social graph with the user; and storing the contact media-related information in the third rating standard; and providing the media recommendation based at least in part on the stored contact media-related information.

18. The machine-readable storage medium of claim 12, further comprising:

receiving one or more user media-related information selections for sharing with one or more users who are in a social graph with the user; and providing the one or more user media-related information selections with respective user accounts for the one or more users.

19. The machine-readable storage medium of claim 12, wherein the first rating information and the second rating information are converted to the third rating standard in response to a user-initiated command.

20. A system, comprising:

one or more processors; and a storage medium including instructions thereon that, when executed by the one or more processors, cause the one or more processors to:

facilitate receiving, from a first remote media service, first rating information for a user and representative of one or more user quality assessments of one or more first media items, the first rating information being provided according to a first rating standard by which media items are rated at the first remote media service;

facilitate receiving, from a second remote media service, second rating information for the user and representative of one or more user quality assessments of one or more second media items, the second rating information being provided according to a second rating standard by which media items are rated at the second remote media service, the second rating standing being different than the first rating standard;

facilitate converting the first rating information and the second rating information to a third rating standard, the third rating standard being different than the first and second rating standards;

facilitate storing the converted first rating information and the converted second rating information as user rating information in connection with a user account of the user;

facilitate receiving an updated assessment for a media item associated with the user rating information, the updated assessment being provided in the third rating standard; and facilitate updating the stored rating information for the media item.

\* \* \* \* \*